United States Patent [19]

Michel et al.

[11] Patent Number: 5,386,308
[45] Date of Patent: Jan. 31, 1995

[54] WEAPON AIMING DEVICE HAVING MICROLENSES AND DISPLAY ELEMENT

[75] Inventors: Claude Michel, Asnieres; Jean-Pierre Le Pesant, Gif S/Yvette, both of France

[73] Assignee: Thomson-CSF, Puteaux, France

[21] Appl. No.: 253,342

[22] Filed: Jun. 3, 1994

Related U.S. Application Data

[63] Continuation of Ser. No. 978,775, Nov. 19, 1992.

[30] Foreign Application Priority Data

Nov. 19, 1991 [FR] France .................. 91 14221

[51] Int. Cl.$^6$ .................. F41G 11/00; G02F 1/13
[52] U.S. Cl. .................. 359/83; 359/41; 359/52; 359/53; 359/82; 42/103; 33/252; 235/404; 235/414
[58] Field of Search .................. 359/36, 40, 51, 52, 359/83, 410; 351/45, 54, 158; 345/8, 32, 33; 235/404, 407, 414, 415; 33/246, 251, 252, DIG. 21; 42/84, 103; 356/252; 89/135

[56] References Cited

U.S. PATENT DOCUMENTS

| | | | |
|---|---|---|---|
| 4,550,984 | 11/1985 | Reymond | 359/409 |
| 4,569,575 | 2/1986 | Le Pesant et al. | 359/245 |
| 4,636,785 | 1/1987 | Le Pesant | 359/228 |
| 4,668,051 | 5/1987 | Mourey et al. | 359/56 |
| 4,701,021 | 10/1987 | Le Pesant et al. | 359/228 |
| 4,731,724 | 3/1988 | Michel et al. | 395/325 |
| 4,734,228 | 3/1988 | Micheron et al. | 264/22 |
| 4,789,228 | 12/1988 | Le Pesant et al. | 359/320 |
| 4,818,052 | 4/1989 | Le Pesant et al. | 385/17 |
| 4,850,681 | 7/1989 | Yamanobe et al. | 359/84 |
| 4,994,204 | 2/1991 | Doane et al. | 359/51 |
| 5,064,270 | 11/1991 | Turpin et al. | 385/13 |
| 5,127,990 | 7/1992 | Pribat et al. | 156/644 |
| 5,141,313 | 8/1992 | Brun | 356/251 |
| 5,205,168 | 4/1993 | Cattin et al. | 73/167 |
| 5,281,957 | 1/1994 | Schoolman | 345/8 |

FOREIGN PATENT DOCUMENTS

| | | |
|---|---|---|
| 0087998 | 7/1983 | European Pat. Off. . |
| 2466822 | 4/1981 | France . |
| 2577694 | 8/1986 | France . |
| 62-127826 | 6/1987 | Japan . |
| 2146477 | 4/1985 | United Kingdom . |

*Primary Examiner*—William L. Sikes
*Assistant Examiner*—Tai Van Duong
*Attorney, Agent, or Firm*—Pollock, Vande Sande & Priddy

[57] ABSTRACT

Material made up of a thin layer between two surfaces, a first and a second, to be used as the third layer of a transparent goggles face, the first layer being a screen and the second layer being a thickness layer, remarkable in that the material consists of a formable transparent polymer matrix having a refractive index and containing micro-cavities in the form of lenses, the micro-cavities being made from a transparent material different from that of the matrix, the refractive index of the material of the micro-cavities changing under the influence of an electric field applied across it, for a first field value the refractive index being equal to that of the matrix, and for a second field value being greater than that of the matrix, a pair of electrodes being associated with each micro-cavity.

8 Claims, 5 Drawing Sheets

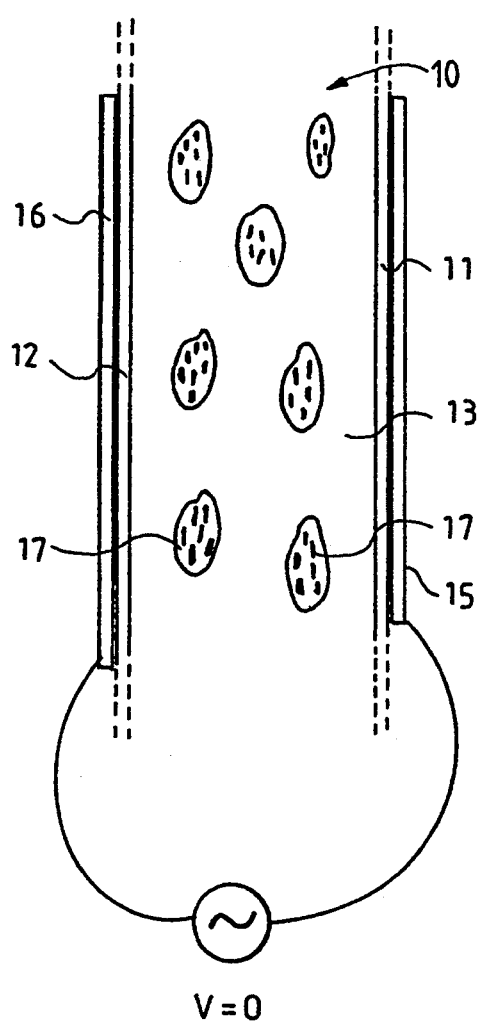
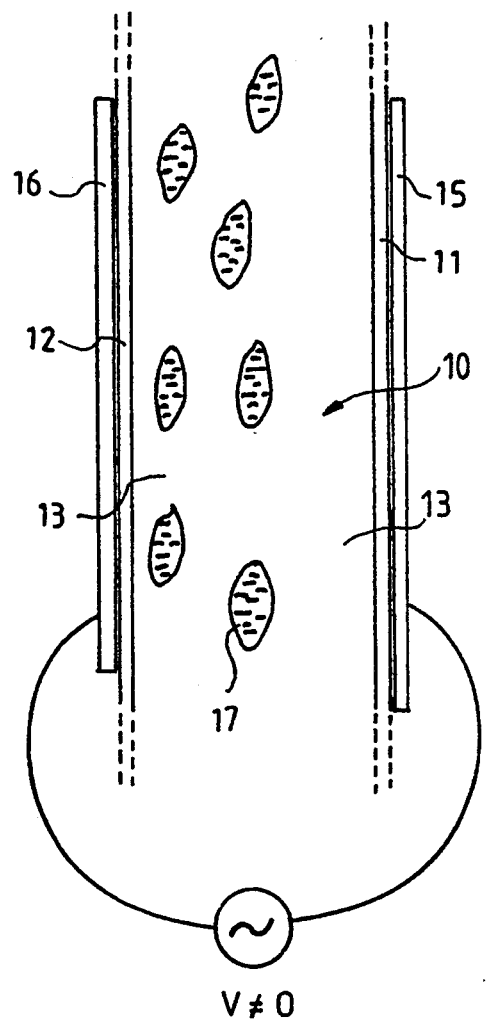
FIG.3a  FIG.3b
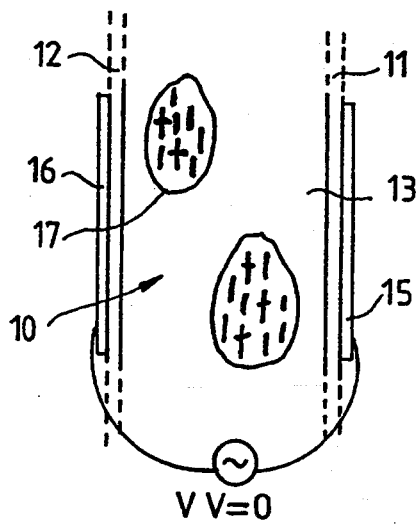
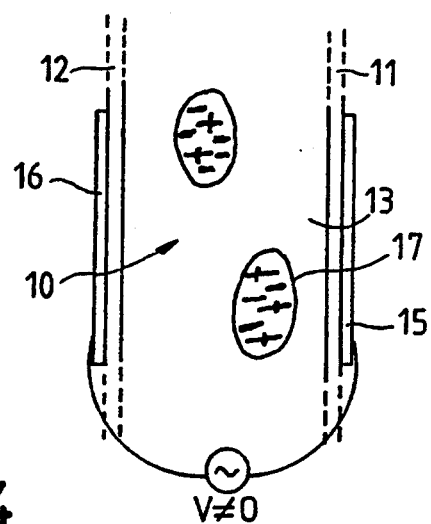
FIG.4

WEAPON AIMING DEVICE HAVING MICROLENSES AND DISPLAY ELEMENT

This application is a continuation of U.S. patent application Ser. No. 07/978,775, filed Nov. 19, 1992.

BACKGROUND OF THE INVENTION

The invention concerns aiming devices for individual or collective weapons in which a collimated cross-hair must be aligned with the selected target.

In the current state of technology the cross-hair is visible through an annular front-sight or an eyepiece attached more or less directly to the weapon. Thus, on a rifle, the cross-hair and the annular front-sight are mounted directly on the barrel of the rifle, and the firer must hold the annular front-sight, and therefore the rifle, in the line of sight. With larger machines such as tanks, the aiming device is independent and a servo-mechanism is employed to aim the weapon at the sighted target, taking into account the range, the wind speed and direction, the type of ammunition fired and more generally all the parameters necessary for the success of the shot. With such devices, the person aiming the weapon must still look at the cross-hair aiming device through an annular front-sight mechanically linked to the aiming system.

SUMMARY OF THE INVENTION

The aim of the present invention is to de-couple the more or less direct mechanical link between the cross-hair aiming device and the weapon system. While being applicable to larger weapons, the invention is particularly well adapted to small arms firing at short range since it permits the permanent visualization of the weapon's aiming cross-hair. The invention aims therefore to permit what is currently called "instinctive aiming??" or "hip-shooting" while knowing the weapon's exact direction of fire and possibly its firing dispersion.

In the case of a single projectile shot, the firing dispersion is represented by a contour surrounding the area likely to be hit by the projectile. In the case of a multiple projectile shot, such as shot-guns pellets, the firing dispersion is the area of dispersal of the individual projectiles from the cartridge.

The device according to the invention can also permit, in certain embodiments, the protection of the firer's eyes against chemical or laser attacks.

In civil applications the invention can be used to visualize the aiming of any device carried by the wearer of goggles incorporating the invention, in particular film, video or still cameras. In such applications, it enables the display of the limits of the optical field of view of the camera. It is also possible to display virtual modifications of the scenery.

The invention relates first to a material which, when used as the glass of goggles, enables the display of an image, in particular a collimated cross-hair, on any part of the surface of the goggles glass, and secondly to the goggles using such a material.

When a firer wears such goggles, he has only to know the direction in which his weapon is aiming, and the direction in which his head is facing in order to be able to correlate the two using a computer and display the weapon's direction on the glass of the goggles.

The invention also relates, therefore, to the weapon which carries the direction sensors, whose data are transmitted, preferably by an infrared (IR) link, to a computer which also receives data relating to the firer's head position. Having calculated the correlation, all that remains is to control the display of the cross-hair in the weapon's pointing direction.

For all these purposes, the invention concerns a material to be used to make the transparent glass of goggles, which consists of at least three successive thin layers, a second layer between a first and third layer, the first layer being made from a transparent material with two surfaces, one of the optical characteristics of the material being locally alterable by the application of an electric field, each of the surfaces of this first layer being equipped with a matrix network of electrodes, the third layer being made from a formable transparent polymer with two surfaces, a first and a second, between which is the material forming the layer, this material consisting of a matrix containing regularly spaced micro-cavities, the micro-cavities being made from a different transparent material to that of the matrix and having two refractive indexes depending on the value of the electric field applied across it (for a first electric field value the refractive index of the material in the micro-cavity is the same as that of the matrix material, and for a second electric field value the index of the material in the micro-cavity is greater than that of the matrix material), electrodes being associated with each micro-cavity in order to enable the modification of the electric field in the micro-cavity, and finally the second layer being a thick transparent layer with the same refractive index as the first layer and as the matrix of the third layer.

The first layer constitutes the display screen, the different local voltages between the electrodes of each surface of the first layer, enable the creation of an image point by point by altering the optical characteristics of the material.

The third layer consists of a micro-lens system which, when activated by a voltage between the electrodes on each of the surfaces of the third layer, permits the collimation of specific points of the layer making up the display screen.

The display screen itself may be advantageously made, according to the invention, using liquid crystals confined between two lightweight formable polymer films resistant to physical shocks. Classic liquid crystals of the nematic helix type may be used: these are of low cost but necessitate the use of polarizers, which implies an incident light absorption of greater than 50% of its intensity.

Other liquid crystals such as chiral smectics may be used. These offer the advantage of faster switching, a bistable effect (memory), and use in very low thicknesses which avoids the problems of parallax and depth of field of the micro-lenses. However, these crystals too require polarizers.

A preferred embodiment of the first layer consists in using liquid crystals dispersed in a polymer matrix, in the form of fine droplets (whose size is of the order of a micron) in which the liquid crystals can be electrically switched between two states. Such dispersions are known to persons skilled in the art. In one of these states, the refractive index is equal to that of the polymer matrix and the whole layer is therefore transparent. In the other state the refractive index is different from that of the polymer matrix which results in the diffusion of the incident light. In the current state of the art, the liquid crystal molecules automatically align themselves parallel to the walls of the droplets so that the sheet containing the droplets is transparent in an electric field, and diffuses when no electric field is applied. By electric switching, the controlled points become diffusing, on a transparent background which allows ambient light to pass, for example light coming from the landscape which is to be viewed simultaneously. The decisive advantage of such a solution is that it does not require polarizers and therefore permits higher levels of transmission.

To increase the contrast of points in the display, pleochroic absorbant colorants which align themselves parallel to the liquid crystals, and thereby follow their orientations controlled by the electric field, are dissolved in the droplets of liquid crystal before their dispersion in the polymer matrix.

The colorants absorb light strongly when they are in an unaligned state, but are transparent when aligned. By this method, black points on a transparent background are obtained. The existence and dissolving of these colorants is known to persons skilled in the art.

In a preferred embodiment, the third layer is made from a transparent, formable polymer material having two half-layers, a first and a second, each half-layer having two surfaces, one smooth the other pitted with micro-cavities, the pitted surfaces of each of the half-layers facing each other so that each micro-cavity of one is opposite a micro-cavity of the other and the micro-cavities thus formed contain electrodes, and are full of a liquid whose refractive index changes under the influence of an electric field, and finally the second layer being a transparent layer between the first layer and the third layer consisting of an over thickness of the half-layer of the third layer situated between the first half-layer and the first layer.

In one specific embodiment of the third layer according to the invention, the micro-lenses consist of small flattened ellipsoids, typically with a diameter of one hundred to several hundred microns, and a thickness of ten to several tens of microns, made of a lightweight material known as a "formable matrix", a polymer for example. The ellipsoids are filled with an electro-optic material whose refractive index changes under the influence of an applied electric field. According to the invention, the electro-optic material is chosen so that in one electrical control state the refractive indices are equal and in the other they are different, the refractive index of the electro-optic material being greater than that of the matrix for light waves arriving with normal or slightly oblique incidence. Thus, in the first control state, the matrix and the micro-lenses are indistinguishable to the naked eye, and there is normal vision through the transparent lens. In the second electrical control state, the refractive indexes are different, and the ellipsoids act as micro-lenses compensating for the focussing at infinity of the eye, enabling it to see the associated point on the display screen, without changing the conditions of observation of the rest of the field of vision.

To obtain a sufficient optical effect, the phase difference of light waves at the center of a micro-lens and those at its circumference must be sufficiently large to produce a very short focal length, compared with that for the plane waves from the image at infinity. This focal length must be of the order of the acceptable thickness of the goggles glass, ideally of the order of one millimeter, or at most several millimeters. In an optical system, the phase shift P is of the form:

$$P = R^2/2f$$

where R is the radius of the lens and f is the required focal length.

As a numeric example, taking $R = 50$ $\mu$m and $f = 500$ $\mu$m, we obtain a phase shift P of 2.5 rad. To obtain such a phase shift in the visible spectrum (wavelengths of the order of 0.5 $\mu$m) with lens thicknesses of the order of 10 $\mu$m a refractive index difference of the order of 0.02 to 0.1 between the two electrically controlled states is necessary. This is not achievable with most materials used in classical optics, but such values can currently be obtained using liquid crystals.

To ensure satisfactory compensation in the field of vision of the eye focussed at infinity, the micro-lenses must be positioned on a surface which is convex relative to the retina of the user's eye, typically on a quasi-spherical surface, so that rays coming from different directions of observation can be seen by different zones of the retina.

In the preferred embodiment of the invention the micro-lenses are included in the thickness of the polymer matrix by various production processes, and are associated with transparent electrodes which permit their electrical control. One production process consists in moulding half-cavities in the surface of two complementary sheets of polymer, which are then joined, face to face, after the induction of liquid crystal to fill the cavities. Another process involves producing a dispersion of liquid crystal in the polymer so as to have phase separation to form "globules" whose size depends in particular on the relative concentration of the constituents according to a "phase diagram" which is understood by persons skilled in the art. In this way, globules are obtained in which the liquid crystal molecules are aligned parallel to the boundary layer between the liquid crystal and the matrix polymer. By a rolling operation, the matrix polymer and the globules which it contains are flattened to give the ellipsoid shape of the micro-lenses.

The control electrodes of the micro-lenses are formed by depositing thin transparent layers (a mixture of indium oxide and tin oxide for example) using techniques based on those already known to persons skilled in the art. To electrically control the micro-lenses, advantageous use can be made of a multiplexed matrix electrode configuration.

Finally, as far as the second layer is concerned, it does not necessarily exist physically as an independent entity. This layer is a layer whose thickness must be equal to the focal length of the micro-lenses. The second layer should be made from the same material as both the first or third layer, so as to avoid reflections.

The material which has been described is used in the system according to the invention to make a goggles glass, the glass being used in the aiming system according to the invention.

In order to calculate the position of the cross-hair on the goggles glass, the goggles are equipped with means for measuring their angular line of sight. The weapon is also equipped with means for measuring the direction in which it is pointing.

The measuring means may be magnetometers, enabling a bearing to be taken relative to the earth's magnetic field in the geographic location of use. It could also be a magnetometer and an inclination meter permitting a bearing relative to the magnetic field in a vertical plane to be taken.

Inclination meters are known to persons skilled in the art. They consist of volumes which are deformable and therefore variable as a function of their inclination relative to the vertical.

The measurement means can also be three accelerometers which, at rest, indicate the direction relative to the vertical. The information from the measurement devices may be transmitted via a link to the computer. The latter calculates the position to display the cross-hair on each goggles glass, the calculation being carried out assuming the weapon to be held on the hip and the sighted target to be at a distance of 15 meters.

In a more sophisticated embodiment, the weapon contains a range finding laser whose output is transmitted to a computer.

The computer will then calculate the display position for the cross-hair as before assuming the weapon to be held on the hip, and also the angle of elevation to be given to the weapon, as a function of the distance and the ammunition fired. The elevation angle is communicated by displaying a symbol on the goggles glass.

The weapon is equipped with a designation button which, when depressed, indicates to the computer that the target aligned with the cross-hair is the sighted target. The direction in which the symbol is pointing is maintained and the aiming is achieved by bringing the cross-hair into coincidence with the symbol.

BRIEF DESCRIPTION OF THE DRAWINGS

A specific embodiment will now be described, with reference to the appended drawings, in which:

FIGS. 3a, 3b and 4 are diagrams used to explain the functioning of one specific embodiment of the screen which makes up the first layer of the material according to the invention;

DESCRIPTION OF THE INVENTION

Figure 1:
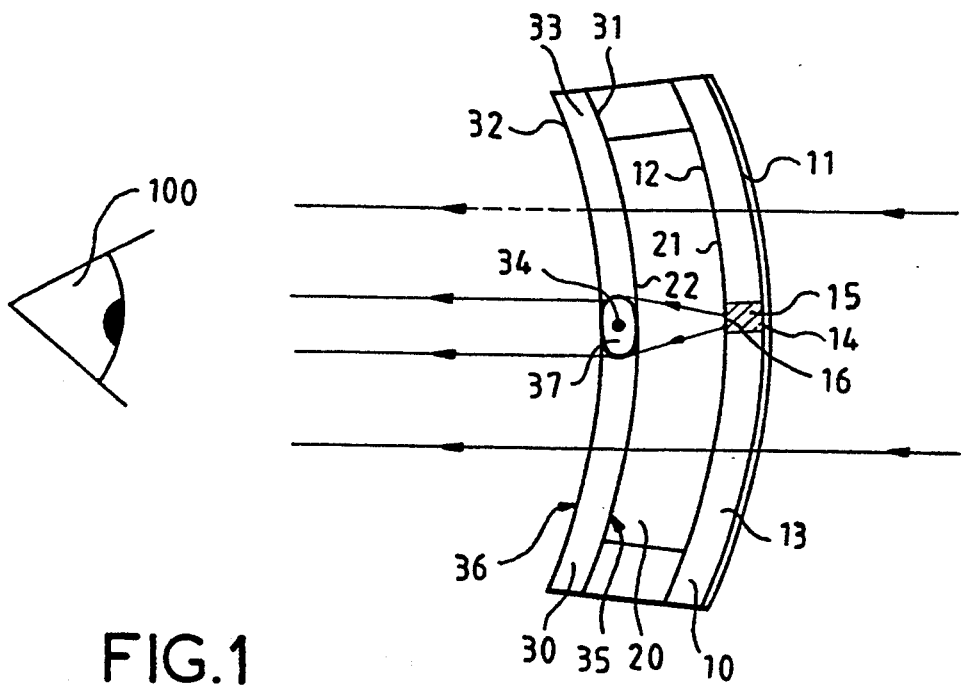
FIG. 1 is a cross-sectional view of a material permitting the fabrication of the goggles glass according to the invention.

FIG. 1 represents a material for the transparent part of the goggles according to the invention. The material consists of three layers 10, 20, 30.

The first layer 10 is the layer called the screen. It has two surfaces 11 and 12. One of the optical characteristics of the transparent polymer material 13 between the two surfaces changes as a function of the local applied electric field. To change the electric field locally over areas corresponding to the dimensions of an image pixel the surfaces 11 and 12 of this layer are equipped with transparent electrodes 15 and 16 constituted by a mixture of indium oxide and tin oxide, corresponding to the size of a pixel, represented by a small hatched area 14.

The layout of these electrodes will be explained later, with reference to FIG. 5.

The second layer 20 has two surfaces 21, 22 and its thickness is equal to the focal length of the micro-lenses included in layer 30. Layer 20 is made from the same polymer (or at least a polymer with the same refractive index) as the one forming layers 10 and 30.

The third layer 30 has two surfaces 31, 32 between which is inserted a transparent polymer material 33 containing micro-cavities 34.

The micro-cavities 34 are facing each of the pixels in the screen layer 10.

The micro-cavities are filled with a liquid 37 whose refractive index has two values depending on the applied electric field. The first value of the refractive index of the liquid 37 is equal to that of the material 34. The second is different, in such a way as to make the cavity behave like a lens. In order to vary the electric field, electrodes 35, 36 are positioned facing each cavity. The layout of these electrodes will be explained later, with reference to FIG. 5.

Figure 2A:
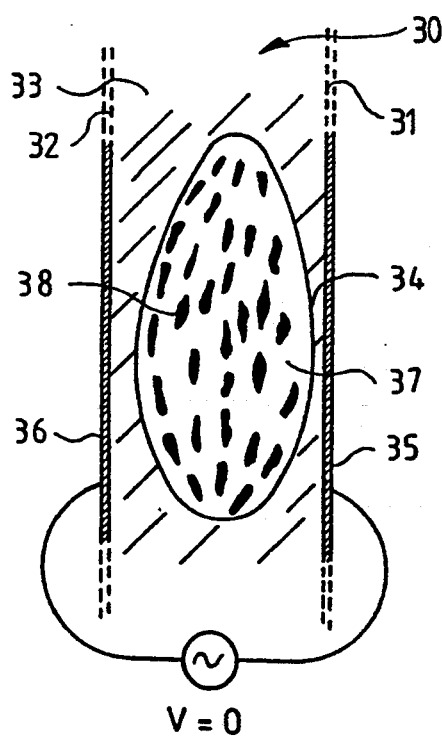
FIGS. 2a and 2b are diagrams used to explain the functioning of the micro-lens network which makes up the third layer of material according to the invention.
Figure 2B:
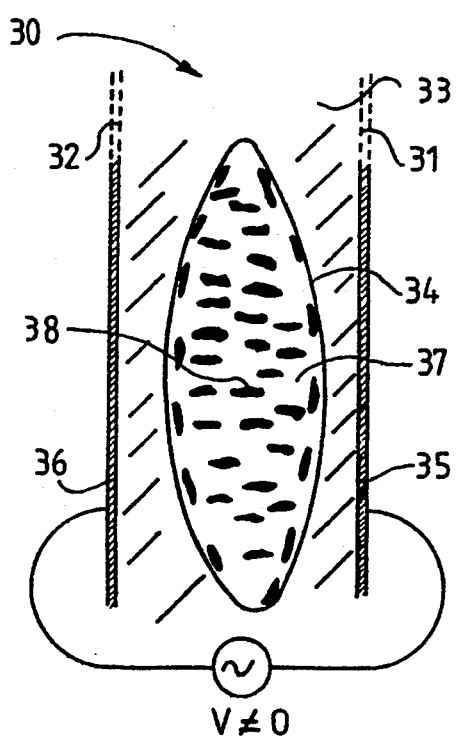

FIGS. 2a and 2b represent a micro-cavity and the liquid 37 which it contains. Elongated black dots represent the molecules 38 of the liquid making up the crystal. In FIG. 2a the potential difference between the electrodes 35 and 36 positioned either side of the cavity on the surfaces 31, 32 is zero. The molecules have automatically aligned themselves with the walls of the micro-cavity 34. In FIG. 2b, with a non-zero potential difference, the central molecules in the cavity have aligned themselves perpendicular to the walls of the micro-cavity, which changes the optical properties of the liquid 37. It is this effect which is used to cause either complete transparency, or a lens effect. For the transparency to be good in one of the potential difference states, the refractive index must be equal, or at least very close, to that of the polymer material 33 making up the layer.

FIGS. 3 and 4 illustrate for one pixel, the functioning of the layer 10 which makes up the screen. A liquid crystal 17 is dispersed in a polymer matrix 13 in the form of droplets whose size is of the order of a micron. In FIG. 3a, in the absence of a potential difference the liquid crystal molecules represented by elongated black dots automatically aligned themselves with the walls of the droplet; in these conditions the droplets are diffusing, and appear as bright spots. However, if a potential difference is applied across the electrodes 15, 16, the molecules align themselves perpendicular to the droplet walls (FIG. 3b), and if the droplet's refractive index is the same as that of the polymer which makes the material 13 of the screen layer, the material is transparent.

In the absence of a potential difference the pixel appears as a brighter spot.

According to a variant used in the specific embodiment the liquid crystal contains a solution of pleochroic absorbant colorants, which are colorants capable of absorbing light waves of different wavelengths. These colorants strongly absorb light in the absence of a potential difference, however, when they are subjected to an electric field, and therefore aligned, they are transparent. The pleochroic colorants are represented as small crosses in FIG. 4.

Figure 5:
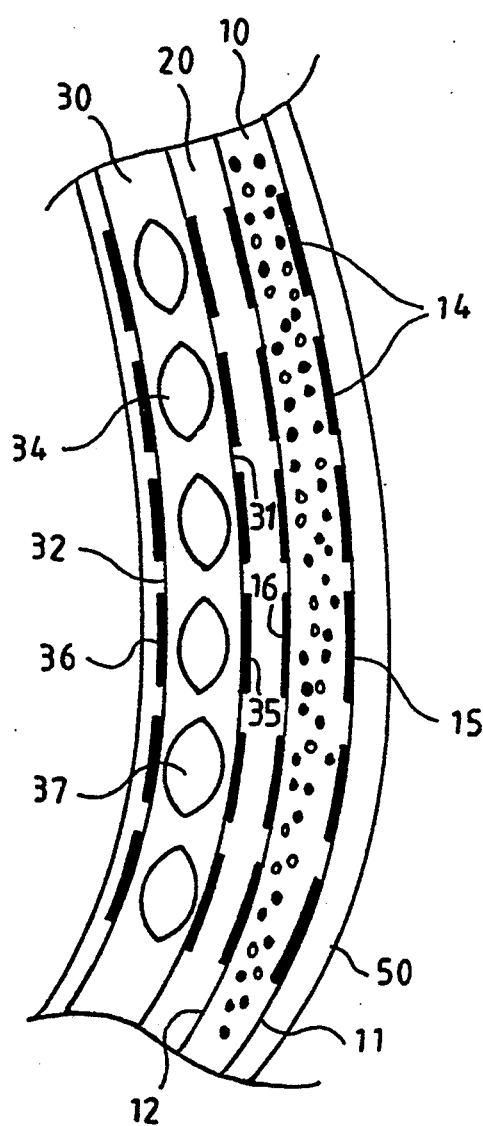
FIG. 5 is a schematic cross-section of a goggles glass using the material according to the invention.

FIG. 5 represents a cross-section of a material made according to the invention. The screen layer the micro-lens layer 30, and layer 20 are shown.

In the embodiment represented in FIG. 5, the screen layer 10 is made from a polymer material containing liquid crystal droplets in suspension, which contain a pleochroic colorant as represented in FIG. 4. The electrodes 15, 16 positioned opposite each other on each of the surfaces 11, 12 of the layer determine the size of each of the pixels which may be activated to create the image. In the embodiment of the invention where the material is hemispherical, the electrodes are arranged in a matrix network along the meridians on one surface and along the lines of latitude on the other. This layout is particularly well suited to a hair-line in the form of a cross. The image may be permanent and its renewal rate only depends on the movement to be given to the cross-hair.

To display images, line scanning using known procedures may be used.

Facing each of the pixels in layer 10, there is in layer 30 a controllable micro-lens constituted by one of the micro-cavities shown in FIG. 2. Facing each cavity there is on each of the surfaces 31, 32 which make up the lens layer an electrode 35, 36. These electrodes are arranged in a matrix network in the same way as the electrodes in the screen layer and synchronously controlled so that the pixels which it is desired to make visible are collimated.

In the embodiment represented in FIG. 5, the lenses are obtained by dispersing the liquid crystal in the polymer. The droplets obtained have a substantially spherical form and their size depends on the relative proportions of crystal and polymer. The polymer film is then rolled to give the spherical droplets an ellipsoid form, with the axis of rotational symmetry perpendicular to the surface of the film. The electrodes are then positioned on the outer surfaces 31, 32 of the layer.

Figure 6:
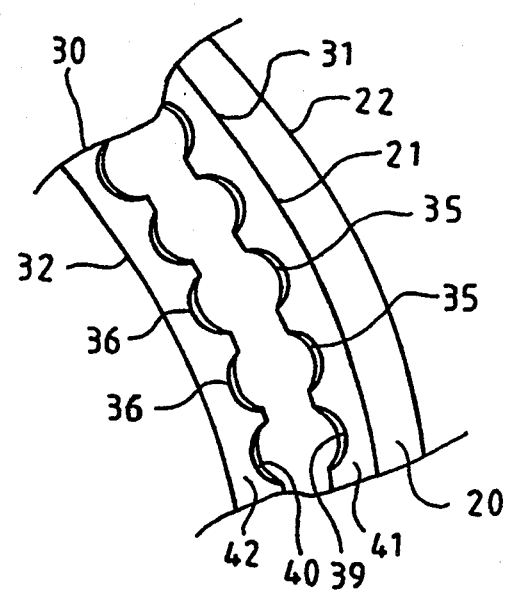
FIG. 6 illustrates a method of producing the material which makes up the layer 30.

According to a currently preferred embodiment, represented in FIG. 6, permitting a higher positioning accuracy of the cavities, the layer 30 is made from two half-layers 41, 42. Each of the half-layers has two surfaces: 31, 39 for one and 32, 40 for the other.

Cavities are regularly distributed on each of the internal surfaces 39, 40. This method also permits the electrodes 35, 36 to be positioned inside the cavities, which reduces the applied potential difference necessary to achieve the same electric field in the electro-optic liquid. Having coated the two internal surfaces 39,40 of the two half-layers 41,42 with an electro-optic liquid, the two half-layers are joined using pressure and heat. The layer 30 produced in this way may have the configuration represented in FIG. 5 with the electrodes on the outer surfaces 31, 32 or the configuration represented in the exploded view in FIG. 6 of the two half-layers in which the electrodes are positioned on the internal surfaces 39, 40 in which the micro-cavities are moulded.

It should be noted that in this embodiment the intermediate layer 20 can consist of an over-thickness of the half-layer 41 whose surface 31 is facing the screen layer. In this case the surfaces 21 and 31 of the layers 20 and 30, facing each other, no longer physically exist.

In the preferred embodiment the material used to make the transparent face of the .goggles contains a fourth layer 50 which is a filter to protect the soldier from laser attacks.

Figure 7:
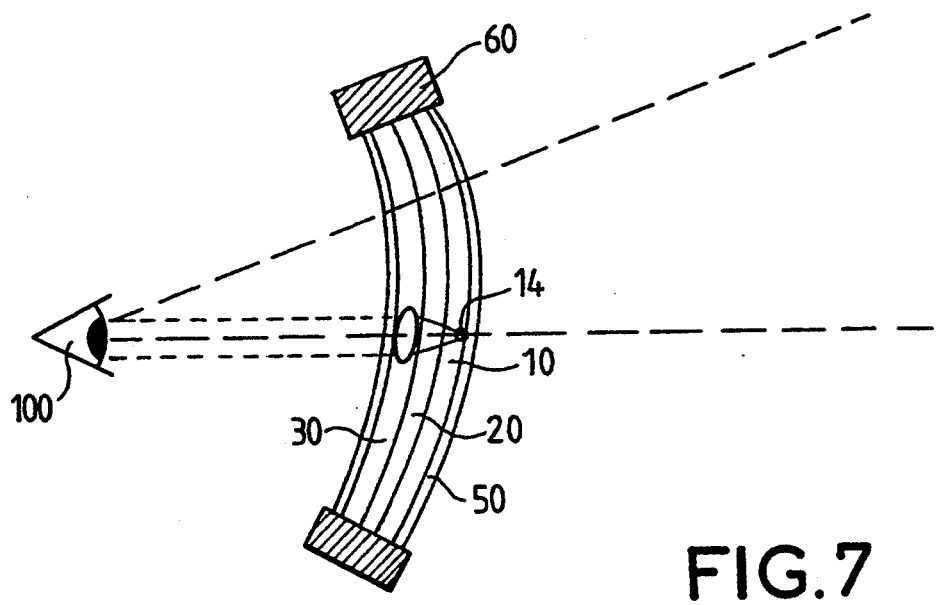
FIG. 7 is used to explain the functioning of the goggles glass according to the invention.

The diagram in FIG. 7 explains the functioning of the goggles. The transparent face of the goggles containing at least three layers 10, 20, 30 and possibly the protective layer 50 and being surrounded by a frame 60 is placed in the field of vision of an eye 100. When a pixel 14 in the layer 10 is activated, the lens 34 facing it is synchronously activated, so that the eye sees the pixel without having to make any focal adjustment.

Figure 8A:
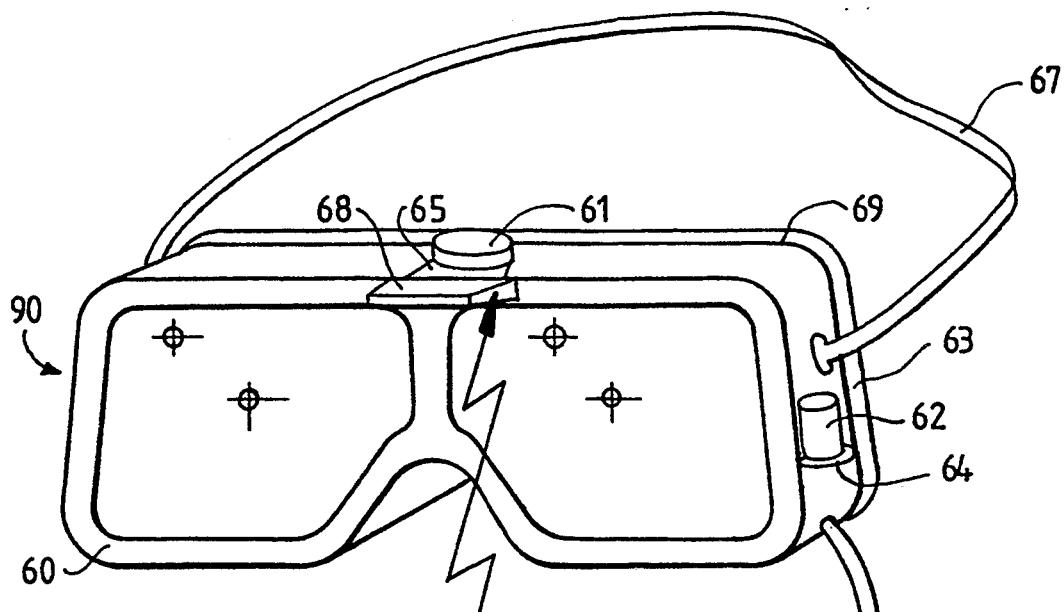
FIGS. 8a and 8b show the functioning of the goggles according to the invention for hip-shooting.
Figure 8B:
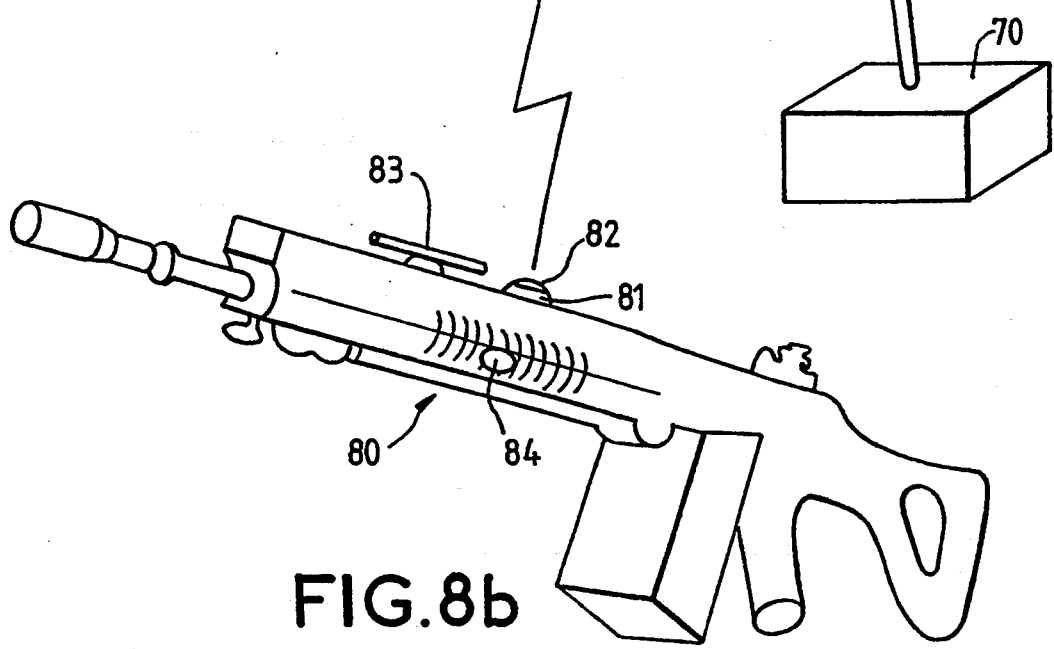

FIGS. 8a and 8b represent goggles 90 equipped with a transparent face according to the invention and a frame 60 to which position sensors 61, 62 are attached. The frame 60 of the goggles looks like the frame of a pair of safety goggles, half way between welder's goggles, and a diver's face-mask or skiing goggles. The edge 69 of the frame, which does not have a transparent face and which presses against the face when it is worn, has an inflatable tube 63 along its circumference. The tube may be inflated orally by the wearer, using a pluggable tube which is not shown. The tube serves to adjust the edge 69 of the frame to the wearer's face, and to increase the volume of air between the goggles and the face. When the goggles are pressed against the face, the quantity of air contained in them is as before inflating the tube, and the goggles remain attached to the face by suction. The tube is made from a non-allergenic insulating material.

Sensor 61 is a magnetometer giving the horizontal bearing or azimuth. Sensor 62 is an inclination meter giving the vertical inclination of the goggles.

The magnetometer 61 is positioned on a flat part 65 of the upper edge of the frame. The inclination meter is mounted on a flat part 64 of a lateral edge of the frame. The azimuth and elevation data from the measuring means 61 and 62 may be transmitted to a computer 70 via a link 66.

The goggles are equipped with an adjustable support strap 67.

It is also equipped with an infrared receiver 68 whose function will be explained later.

The weapon 80 used with the goggles 90 is a normal weapon represented in FIG. 8b. The weapon has been modified to include a combined elevation and bearing sensor 81 whose values are sent to an infrared transmitter 82 positioned above the sensor 81. The sensor and the transmitter are positioned as close as possible to the muzzle of the weapon's cannon, so as to increase the probability that the transmitter 82 and the infrared receiver 68 of the goggles 90 are permanently facing each other when the weapon 80 is in the firing position.

In the embodiment according to the invention, the weapon contains a range finding laser 83 enabling the distance to be measured, and the elevation to be set as indicated earlier. Depression of a push button 84 enables the transmission of a special code from the transmitter 82 and the functioning of the range finding laser 83.

The functioning is as follows: the weapon direction data coming from the group of sensors 81 are transmitted by the infrared transmitter 82 to the receiver 68 of the goggles 90. The data, possibly also containing the designation code transmitted by pressing the button 84 and the distance of the target, are transmitted via the previously mentioned link 66 to a computer 70. The computer also receives the position data coming from the sensors 61, 62 of the goggles 90. The position data are transmitted every 30 ms. The computer calculates the relative directions of the weapon and of the goggles axis, and consequently displays the position of the crosshair.

When the button 84 is pressed, the reception of the signal causes an interrupt which changes the calculation in progress to introduce the distance data and the pre-stored data relating to the type of ammunition.

The computer then calculates the angle of elevation and displays in the goggles glass the useful aiming direction by means of a symbol. The firer must then align the cross-hair on his goggles glass with the symbol.

Some possible applications of the goggles alone, with a computer are:

Visualization of an operational reality, partly or totally hidden:
  combat behind an earth ridge or hill, reconstituted and displayed in the correct direction by the computer, based on data supplied by other observers (look-outs, helicopters, etc.)
  internal layout of a building of which only the outer walls are visible, but whose interior is known from archived data.

Representation of "virtual reality" for applications in:
  civil engineering or architecture (on-site superpositional representation of works of art or buildings to be built),
  archeology (representation of the initial state of ruined buildings) with auxiliary devices equipped with direction sensors.

With auxiliary devices equipped with direction sensors the possible range of applications is:
  aiming device for firing bursts from an automatic weapon equipped with sensors, for hip-firing of grenade launchers, and for mortars.
  filming using a device containing a camera equipped with direction sensors.

For the cinema, permanent display of the pointing direction, and the field of view, virtual presentation of changes of scene or the cast (positions, attitudes, etc.).

For video and notably camcorders, permanent display of aiming direction and frame-size without using the viewfinder (which could enable certain tourists not to see the whole of their trip through the viewfinder of their camcorder!).

With known state-of-the-art materials, the device response times depend on the response time of layer 10 which makes up the screen. This ranges from 40 ms when the temperature is 25° C. to 200 ms when the temperature is 0° C.

Figure 9:
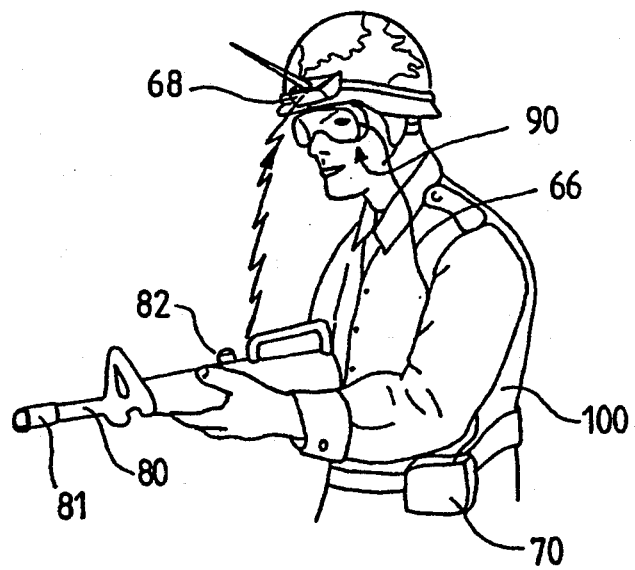
FIG. 9 represents a soldier equipped with the complete device according to the invention, including an individual weapon, a computer and the goggles according to the invention.

FIG. 9 represents a soldier 100 equipped with a rifle 80, goggles and a computer 70 according to the invention.

What is claimed is:

1. A control system for a barreled weapon, comprising: goggles including
  (a) a first layer of transparent material having opposite surfaces, the material having its optical characteristics alterable under the influence of a changeable electric field applied thereacross;
  (b) arrays of electrodes formed on each of the surfaces for generating the electric field thereacross;
  (c) a third layer, spaced from the first layer and having opposite surfaces and an intermediate transparent polymer matrix therebetween in which micro-cavities are enclosed which serve as micro-lenses having optical axes perpendicular to the two-third layer surfaces;
  (d) the micro-cavities made from a transparent material different from that of the polymer matrix and having refractive indices which, is selectably changeable in response to changes in an electric field passing between the two third layer surfaces;
  (e) the material of the micro-cavities having the same refractive index as the matrix material for a first electric field value, and a greater refractive index than the matrix material for a second electric field value;
  (f) arrays of electrodes formed on each of the third layer surfaces for generating the electric field thereacross;
  (g) a second intermediate layer interposed between the first and third layers and fabricated from a transparent polymer;
  means located on the weapon for measuring the direction in which it is pointed;
  means, mounted on the weapon, for transmitting data from the measuring means;
  means mounted on the goggles for receiving direction measurement data;
  means connected to a receiving means output for communicating direction measurement data to a computer; and
  communication means for linking an output of the computer to the electrode arrays.

2. The system set forth in claim 1 wherein the third layer further comprises:
  two attached transparent polymer half layers, each of which has two surfaces, one smooth and the other pitted with micro-cavities, the pitted surfaces of the half layers confronting each other to form aligned micro-cavities;
  the micro-cavities being filled with electro-optic fluid having two refractive indices, switchable in response to an applied electric field; and
  arrays of electrodes located on the half layers.

3. The system set forth in claim 1 wherein the micro-cavities are hemispheres.

4. The system set forth in claim 1 wherein one of the half layers is thicker than the other.

5. The system set forth in claim 1 wherein the receiving means is an infrared receiver.

6. The system set forth in claim 1 wherein the goggles further comprise an inflatable peripheral face seal.

7. The system set forth in claim 1 wherein the transmitting means is an infrared transmitter.

8. The system set forth in claim 1 wherein the weapon further comprises:
  a range finding laser; and
  a switch mounted to the weapon, for initiating a range measurement by the laser, and subsequently transmitting a code by the transmitting means.

* * * * *